United States Patent
Kennedy (10) Patent No.: US 8,176,554 B1
(45) Date of Patent: May 8, 2012

(54) MALWARE DETECTION THROUGH SYMBOL WHITELISTING

(75) Inventor: Mark Kennedy, Cupertino, CA (US)

(73) Assignee: Symantec Corporation, Cupertino, CA (US)

( * ) Notice: Subject to any disclaimer, the term of this patent is extended or adjusted under 35 U.S.C. 154(b) by 1013 days.

(21) Appl. No.: 12/130,206

(22) Filed: May 30, 2008

(51) Int. Cl.
*H04L 29/06* (2006.01)
(52) U.S. Cl. .......................................................... 726/23
(58) Field of Classification Search ...................... 726/23
See application file for complete search history.

(56) References Cited

U.S. PATENT DOCUMENTS

| | | | |
|---|---|---|---|
| 2005/0262558 A1* | 11/2005 | Usov | 726/22 |
| 2006/0150256 A1* | 7/2006 | Fanton et al. | 726/27 |
| 2008/0127038 A1* | 5/2008 | Park et al. | 717/100 |

* cited by examiner

*Primary Examiner* — Jason Gee
(74) *Attorney, Agent, or Firm* — Fenwick & West LLP (57) ABSTRACT

A security module identifies symbols within an executable file. The security module compares these identified symbols to a set of symbols expected to be present in a legitimate executable file. Based at least in part on an identified symbol not being within the set of expected symbols, the security module determines that the executable file poses a heightened security risk. In one embodiment, a remediation module takes an appropriate response to prevent potential malware exploits by the executable file.

18 Claims, 5 Drawing Sheets

MALWARE DETECTION THROUGH SYMBOL WHITELISTING

BACKGROUND OF THE INVENTION

1. Field of the Invention

This invention pertains in general to computer security and in particular to detecting malware.

2. Description of the Related Art

Modern computer systems are often susceptible to a wide variety of security threats on the part of malicious software ("malware") that secretly performs operations not desired by the computer user, such as data theft, file destruction, installation of backdoor programs, and the like. One common technique used by security software for malware detection involves the use of signatures, in which newly-discovered malware is analyzed and distinctive sequences of code ("signatures") are extracted. Subsequently, security software examines code residing on a monitored machine to determine whether the code contains the malware signature; if it does, then the code is flagged as malware.

In order to evade signature-based approaches, some polymorphic malware uses various techniques to disguise itself. For example, some polymorphic malware performs post-processing operations to alter the code initially produced by a compiler or other code-generating utility so that it will not contain a consistent malware signature for security software to flag. One such technique is compression, in which the malware compresses its code, later using an included decompression module to decompress the code at runtime. Such compression may occur at various times, such as when the malware replicates itself from one computer system to another, or when it first executes on a given computer system. Another technique is obfuscation, which alters the code of the malware without necessarily compressing it, such as by inserting "no-operation" instructions at strategic locations. In either case, the malware code is changed by the post-processing, so that it is difficult to create a signature that will consistently identify the malware. The term "post-processed" program as used herein designates a program whose executable file has been substantively altered, e.g. by the compression or obfuscation techniques mentioned above, or by other file-altering techniques.

Some conventional techniques exist to detect post-processing of executable program files, but suffer from various shortcomings. For example, it is possible to disassemble code sections of an executable file and to analyze the code section to determine whether it contains any code sequences that are nonsensical for a given processor, such as machine language instructions that would never follow each other in sequence. The presence of such code sequences, which would not be output by a legitimate compiler or other code generation utility, indicates that the executable file was post-processed subsequent to its initial generation. As another example, it is possible to calculate the degree of "entropy"—variation in the values of the respective bytes—in the executable file, with low entropy indicating that the file was likely compressed to compact together sections of the code having the same value. However, both code sequence analysis and entropy calculations are computationally expensive. Additionally, entropy calculations, though capable of detecting code compression, cannot detect code obfuscation, which does not significantly alter the degree of entropy of an executable file.

BRIEF SUMMARY

The difficulties described above are addressed by a method, computer, and computer program product that determine whether an executable file poses a heightened risk of malware by examining the symbols of the file.

One embodiment of the method identifyies a plurality of symbols in the executable file and compares the identified symbols to a set of symbols expected to be present in a legitimate executable file. The method determines that the executable file poses a heightened risk of malware, responsive at least in part to the comparison indicating that an identified symbol is not within the set of expected symbols.

A computer adapted to detect whether an executable file poses a heightened risk of malware, comprises a computer-readable storage medium storing executable computer program modules. The computer program modules comprise a symbol repository adapted to store a plurality of symbols expected to be present in a legitimate executable file. The modules further comprise an analysis module for identifying a plurality of symbols in the executable file, comparing the identified symbols to the plurality of symbols expected to be present, and determining that the executable file poses a heightened risk of malware responsive at least in part to the comparison indicating that an identified symbol is not within the set of expected symbols.

Embodiments of the computer program product have a computer-readable storage medium storing executable computer program modules for detecting whether an executable file poses a heightened risk of malware, the modules comprising a symbol repository adapted to store a plurality of symbols expected to be present in a legitimate executable file. The modules further comprise an analysis module for identifying a plurality in symbols of the executable file, comparing the identified symbols to the plurality of symbols expected to be present, and determining that the executable file poses a heightened risk of malware responsive at least in part to the comparison indicating that an identified symbol is not within the set of expected symbols.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
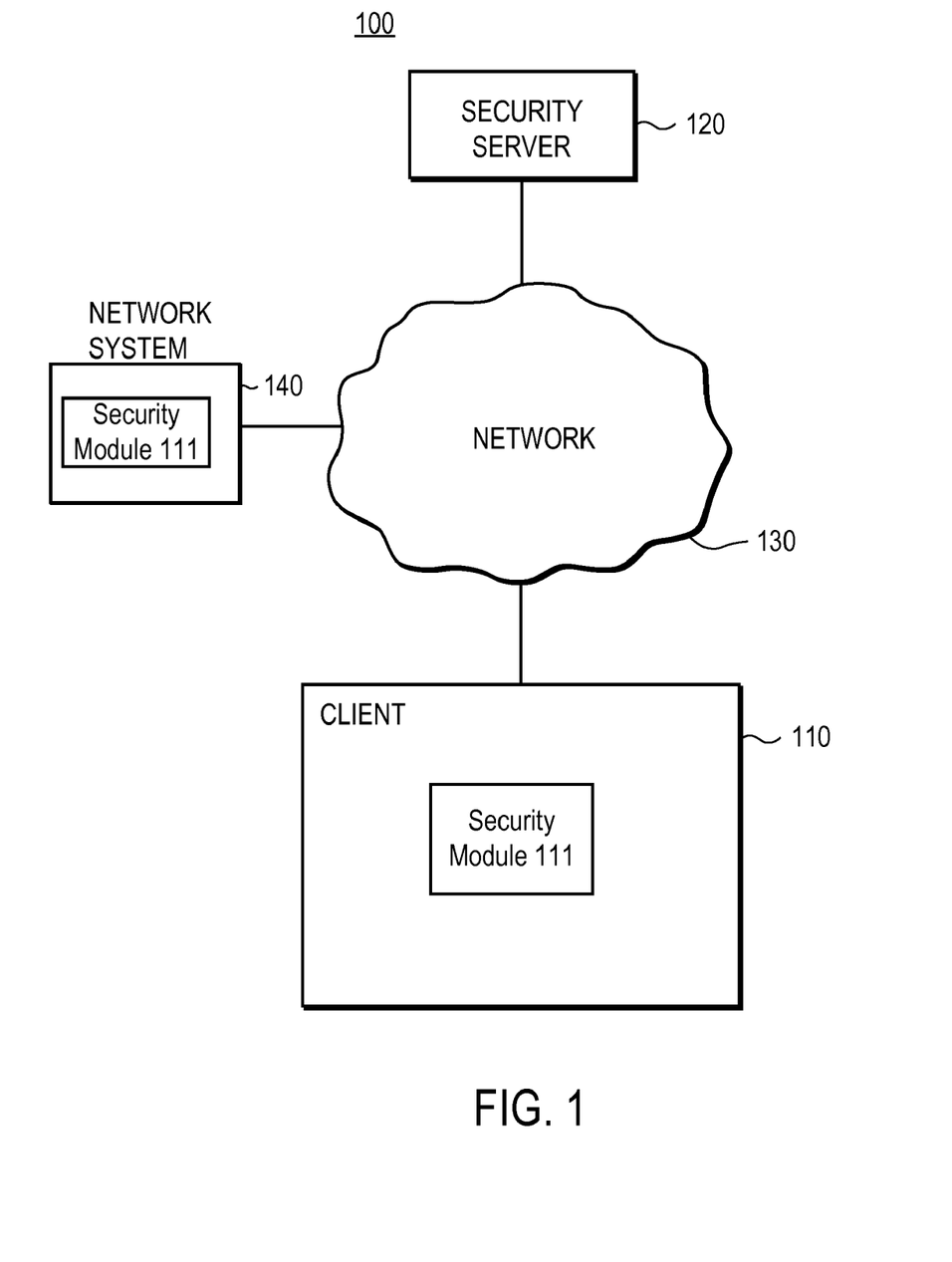
FIG. 1 is a high-level block diagram of a computing environment according to one embodiment.

FIG. 1 is a high-level block diagram of a computing environment 100 according to one embodiment. FIG. 1 illustrates a client 110 and a security server 120 connected by a network 130, the security server 120 providing services such as security updates to the client 110. Also connected to the network 130 is a network system 140 that acts as an intermediary between a source and destination of communication over the network 130. Only one client 110, one security server 120, and one network system 140 are shown in FIG. 1 in order to simplify and clarify the description. Embodiments of the computing environment 100 can have thousands or millions of servers 120, clients 110, and network systems 140 connected to the network 130.

The client 110 can execute a variety of executable programs obtained from a variety of sources, such as from servers accessible via the network 130. As mentioned above, some of these programs may be malware, containing malicious code that secretly performs undesirable actions, such as modifying system files, installing backdoor programs to secretly monitor and report on user data, copying personal financial data, or the like. As noted, many types of malware disguise themselves through post-processing techniques such as compression and obfuscation, with the result that their executable files are altered to contain non-standard section names or other symbols.

A security module 111 executing on the client 110 examines programs on the client 110 to identify those posing a heightened risk of malware. In one embodiment, the security module 111 identifies symbols present in a header portion of an executable file of a potential malware program. For example, in one embodiment the symbols identified are names of sections present in a section table of the program's executable file. These symbols are then compared to a set of expected symbols. If the identified symbols contain symbols that are not in the set, then the security module 111 determines that this finding indicates that the program poses a heightened risk of malware. The security module 111 thus takes an action to prevent the potential malware from causing harm.

The network system 140 acts as an intermediary between a source and destination of communication over the network 130, e.g. between the client 110 and some other system attached to the network 130. The network system 140 could be, for example, a router, a proxy server, or a mail server. The network system 140 also includes an instance of the security module 111. The security module 111 is applied to programs being transferred over the network 130, and blocks delivery of a program responsive to determining that it constitutes potential malware.

In some embodiments, the security server 120 may provide updates regarding the expected symbols to the security module 111. The server may also provide additional information, such as signatures for identifying certain types of malware. In such embodiments, the security server 120 provides the information to the client 110 via the network 130.

The network 130 represents the communication pathways between the security server 120 and client 110. In one embodiment, the network 130 is the Internet. The network 130 can also utilize dedicated or private communications links that are not necessarily part of the Internet. In one embodiment, the network 130 uses standard communications technologies and/or protocols such as Ethernet, 802.11, etc. Similarly, the networking protocols used on the network 130 can include the transmission control protocol/Internet protocol (TCP/IP), the hypertext transport protocol (HTTP), the file transfer protocol (FTP), etc. The data exchanged over the network 130 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
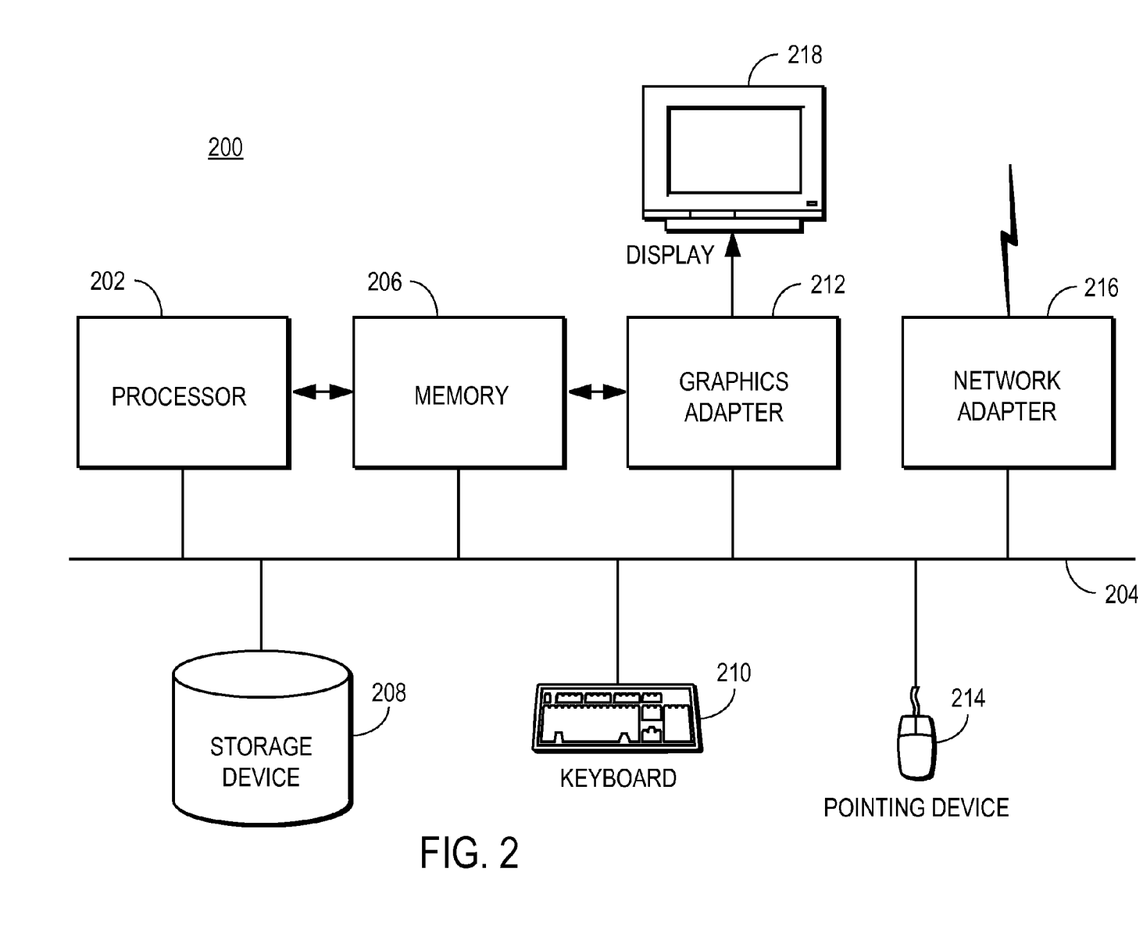
FIG. 2 is a high-level block diagram illustrating a typical computer for use as a client or server according to one embodiment.

FIG. 2 is a high-level block diagram illustrating a typical computer 200 for use as a client 110, security server 120, or network system 140 according to one embodiment. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 130. The storage device 208 is, in one embodiment, a hard disk drive but can also be any other device capable of storing data, such as a writeable compact disk (CD) or DVD, a solid-state memory device, or other form of computer-readable storage medium. The storage device 208 stores the files for the operating system, applications, etc.

The types of computers 200 utilized by the entities of FIG. 1 can vary depending upon the embodiment and the processing power utilized by the entity. For example, a client 110 that is a personal digital assistant (PDA) typically has limited processing power, a small display 218, and might lack a pointing device 214. The security server 120, in contrast, may comprise multiple blade servers working together.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The programs examined by the security module 111 are formed of one or more files that typically reside on the storage device 208 and are loaded into memory 206 when executed. At least one of the files loaded into memory 206 is referred to as the "executable file" and is executed as a process when executed in a traditional manner.

Figure 3:
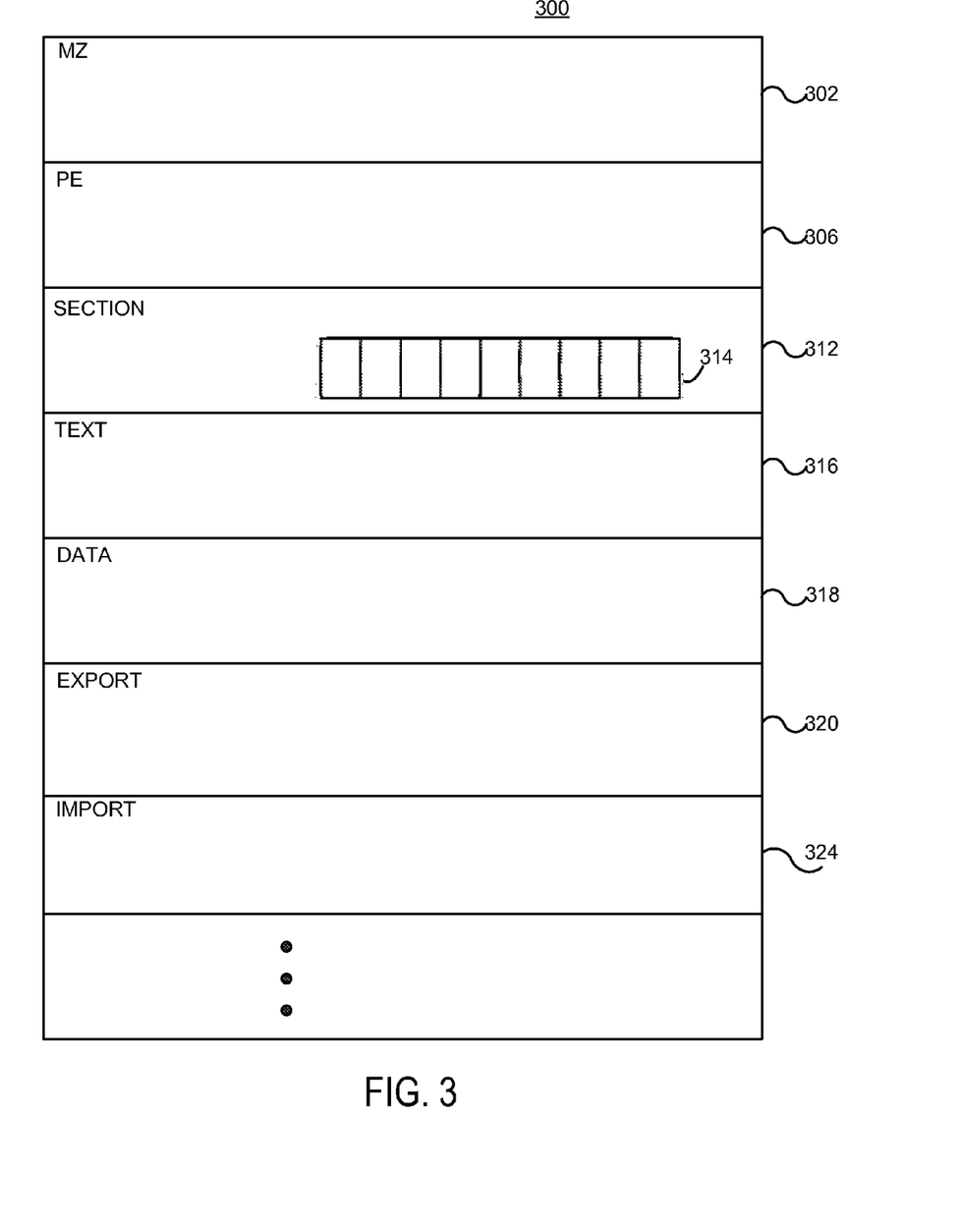
FIG. 3 is a high-level block diagram of an executable file, according to one embodiment.

FIG. 3 is a high-level block diagram of an executable file 300. In the example illustrated by FIG. 3, the executable file is a Win32 portable executable (PE) file intended for use with a MICROSOFT WINDOWS-based operating system (OS), such as WINDOWS 98, WINDOWS NT, WINDOWS 2000, and WINDOWS XP. Typically, the illustrated file 300 is of the type .EXE, indicating that the file is an executable file, or of type .DLL, indicating that the file is a dynamic link library (DLL), an executable code unit that is loaded and linked at program runtime. However, the present invention can be used with any file, and is not limited to only the type of file illustrated in FIG. 3. APPLE MACINTOSH files, for example, share many similarities with Win32 files, and the present invention is equally applicable to such files.

The executable file 300 is divided into sections containing either code or data and aligned along four kilobyte (KB) boundaries. Some sections represent code and data of the program, and other sections, such as the section table, represent metadata about the program.

The MS-DOS section 302 contains a small executable program designed to display an error message if the executable file is run in an unsupported OS (e.g., MS-DOS).

The PE section 106 holds a data structure 310 containing basic information about the executable file 300. The data structure 310 holds many data fields describing various aspects of the file 300.

The next section 312 holds the section table 314. The section table 314 contains information about each section in the file 300, including the section's name, type, size, and location in the file 300. For example, entries in the section table 314 indicate the name, such as ".code" or ".text" that serves to identify it, whether a section holds code or data, whether the section is readable, writeable, and/or executable, the section's length in bytes, and the byte location at which the section begins The section names are implemented as fixed-length character arrays, and are initially generated by a compiler or other code-generation utility, although they may be changed subsequently by utilities employing techniques such as compression or obfuscation.

The text section 316 holds general-purpose code produced by the compiler or assembler. The data section 318 holds global and static variables that are initialized at compile time. The export section 320 contains an export table that identifies functions exported by the executable file 300 for use by other programs. The import section 324 has an import table that identifies functions that are imported by the executable file 300.

Figure 4:
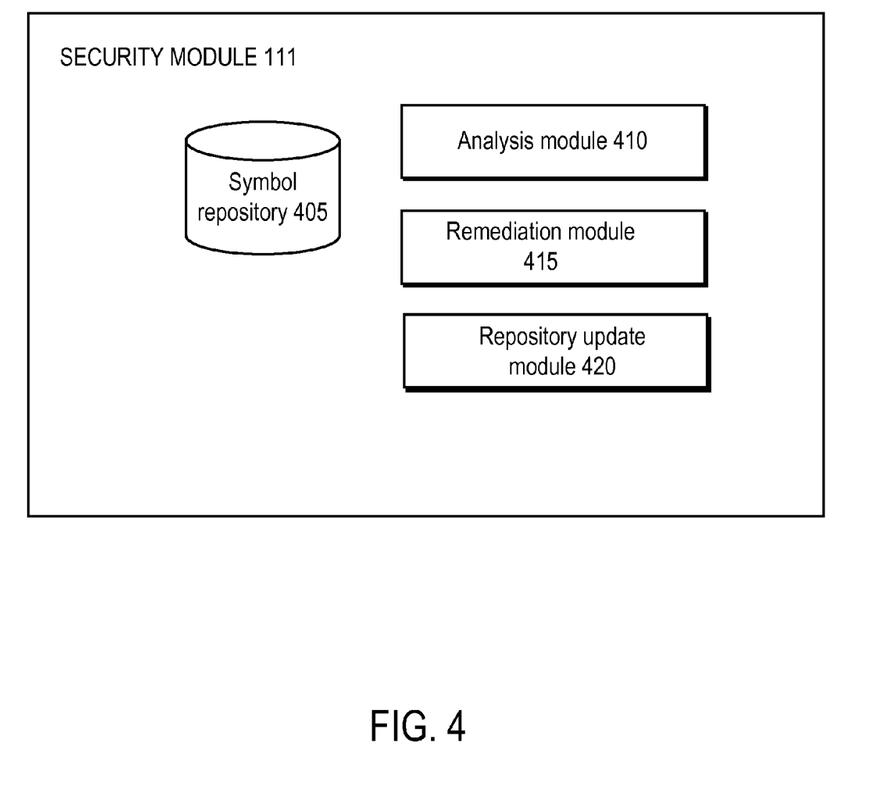
FIG. 4 is a high-level block diagram illustrating a detailed view of a security module, according to one embodiment.

FIG. 4 is a high-level block diagram illustrating a detailed view of modules within the security module 111 according to one embodiment, including the symbol repository 405, the analysis module 410, the remediation module 415, and the repository update module 420.

The symbol repository 405 stores the list of symbols which the security module 111 expects to find within an executable file of an original, legitimate program, e.g. one known not to employ compression or obfuscation techniques or to contain malware. In one embodiment, the list of symbols comprises section names used in the file's section table 314, the section names being generated by compilers and other code-generating utilities used to create the programs. The list of symbols can be assembled through examination of a set of executable files of legitimate programs. In one embodiment, the legitimate programs that are examined are a set of known, widely-used programs, e.g. several hundred programs such as MICROSOFT WORD, ADOBE PHOTOSHOP, MOZILLA FIREFOX, and the like. In one embodiment, the programs that are examined include programs by a variety of different authors, created with different software development tools, and targeted for different operating systems and hardware platforms. In one embodiment, the symbol repository 405 stores the union of all symbols (e.g., section names) extracted from the examined programs. Thus, in this embodiment the symbol repository 405 approximates the set of all symbols generated by code-generating utilities. In one embodiment, this set of symbols is computed and stored in the symbol repository 405 by a provider of the software embodying the security module 111, so that the client 110 need not itself analyze executable files and compute the set of symbols. The symbol repository 405 may be implemented in different manners in different embodiments, such as by using a table of a relational database management system.

In some embodiments, the security module 111 additionally contains a repository update module 420 that updates the symbol repository 405. As noted, compilers and other code-generation utilities generate executable files that have symbols, e.g. section names, drawn from the limited set of symbols used by the compiler. Subsequent versions of a compiler may create additional symbols not created by previous versions, or certain symbols may cease to be created by a new version of the compiler. Thus, a master symbol repository may be maintained on the security server 120 and used to update the individual symbol repositories 405 of the various clients 110. In such an embodiment, the repository update module 420 periodically contacts the security server 120 to receive updates, e.g. adding new symbols recently introduced by a particular compiler. The updates could be implemented in a great variety of different ways. For example, they could be performed at regular intervals, or in response to a user request, and they could involve the repository update module 420 requesting from the security server 120 a set of changes since a given date, or simply requesting the entire latest version of the symbol repository. Many other implementations would be equally possible to one of skill in the art.

The analysis module 410 determines whether a given executable file presents a heightened risk of malware by comparing the symbols found within the executable file to the symbols in the symbol repository 405. In one embodiment, the analysis module 410 iterates through all the sections listed in the file's section table 314, noting the name of each and determining whether that name is present in the symbol repository 405. Since the symbol repository 405 approximates the set of all symbols, e.g. section names, known to be generated by code-generating utilities, the presence of a symbol not within the symbol repository 405 implies that that the executable file is not in a form originally generated by a code-generating utility, but rather has been altered by techniques such as compression or obfuscation. Thus, the analysis module 410 can detect executable files that present a heightened risk of malware, since malware frequently employs such code-altering techniques. Although there are some legitimate, non-malicious reasons for an executable file to employ such techniques, in a relatively large percentage of cases such files are malicious. Thus, a determination that a given executable file employs the techniques serves as a useful indicator that the file constitutes malware.

The analysis module 410 may employ different tests in different embodiments to determine that the executable file being examined presents a heightened risk of malware. In one embodiment, the analysis module 410 considers the executable file to present a heightened risk if there is a single symbol in the executable file that is not already in the symbol repository. In another embodiment, the analysis module 410 does not consider the executable file to present a heightened risk unless it finds a threshold number of symbols not within the symbol repository. The threshold could be, for example, a fixed number of symbols, or a fixed percentage of the total number of symbols in the executable file.

The analysis module 410 may operate at different times in different embodiments. For example, in one embodiment it proactively examines an entire set of executable files stored on disk, e.g. as part of a scheduled file system scan. In another embodiment, the analysis module 410 operates reactively, examining an executable file in response to a particular event related to the executable file. Examples of such events include the file being slated for execution by a user double-clicking the icon of its file in a graphical user interface, or the file being transferred to the client 110 via a download over a network. In another embodiment, the approaches are combined, with proactive periodic file system scans leading to the examination of the majority of files, and reactive examinations employed only for new files not yet examined by the proactive scans. In one embodiment, the examination performed by the analysis module 410 is incorporated into conventional security software as an additional malware-discovery technique supplementing those already employed by the security software.

The remediation module 415 takes an action in response to the analysis module 410 determining that a given executable file poses a heightened risk of malware. In one embodiment, the remediation module 415 takes an action according to a policy specified by a user of the software embodying the security module 111, e.g. via a configuration file, or a preference setting in a graphical user interface of the software. For example, a network administrator of the network system 140 might configure the remediation module 415 to block delivery or execution of an executable file posing a heightened risk of malware. A user of a client system might prefer to configure the remediation module 415 to issue a warning or prompt, such as an alert dialog box noting that the executable file has been post-processed and asking the user whether to permit the executable file to execute.

In one embodiment, the remediation module 415 triggers additional, more computationally-demanding analysis to determine whether the executable file is indeed malicious, allowing execution of the file if it is determined not to be malware, and blocking execution if the file is determined to be malware. This analysis could comprise scanning the executable file to determine whether it contains a signature on a security whitelist, the security whitelist representing programs that have been post-processed, e.g. via obfuscation, but which are nonetheless known to be non-malicious. In one embodiment, before taking one of the above actions, the remediation module 415 first contacts the security server 120 to ensure that the symbol or symbols not found within the local symbol repository 405 have not been determined, subsequent to the last update of the remediation module 415, to be created by new legitimate compilers, or new versions of previously-known compilers. In one embodiment, the remediation module 415 accomplishes this by obtaining updates, if any, to the list of expected symbols stored locally in the symbol repository 405. In another embodiment, the additional analysis described above takes place only if specified by a user, e.g. via a preference setting in a security software package that embodies the security module 111.

Figure 5:
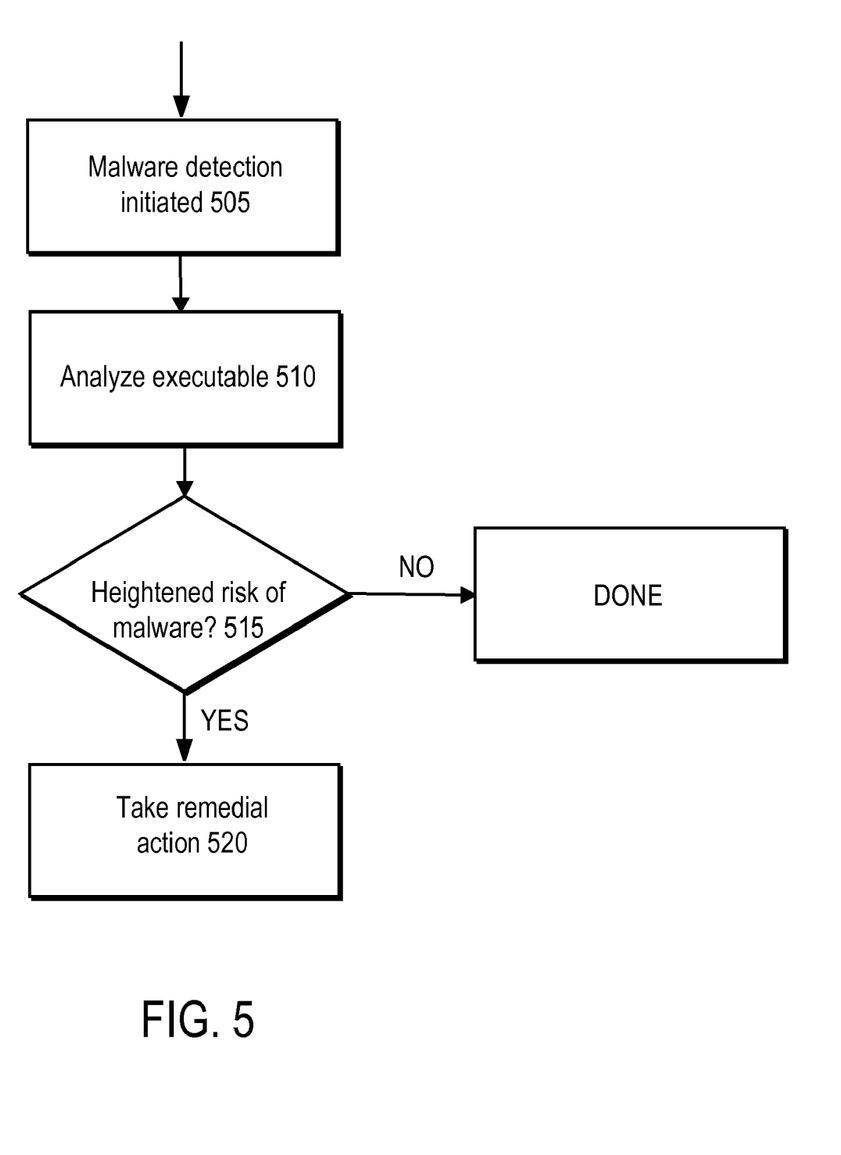
FIG. 5 is a flowchart illustrating steps performed by the security module to detect malware, according to one embodiment.

FIG. 5 is a flowchart illustrating steps performed by the security module 111 to detect malware, according to one embodiment. First, the detection of malware is initiated. As noted above, detection can be initiated in response to different events in different embodiments. For example, the detection could be initiated as part of an overall file system scan, or in response to the arrival of an executable file over the network, such as via email or downloading from a web site. In one embodiment, the security module 111 is embodied within a security software package, which initiates the detection of malware by the security module 111, possibly as one of a number of possible alternate techniques for malware detection.

Subsequently, the security module 111 analyzes 510 one or more executable files. For each executable file analyzed, the security module 111 examines the symbols present in the executable file and compares them to the symbols present in the symbol repository 405. As previously noted, in one embodiment such symbols are names of sections of a section table. Based on the comparison, the security module 111 may determine 515 that the executable file poses a heightened threat of malware. For example, in one embodiment, the security module 111 determines that the executable file poses a heightened threat of malware if it contains a symbol not present in the symbol repository 405.

If the security module 111 determines that the executable file does not pose a heightened threat of malware, then it may allow the file to execute, or specify that further analysis should be performed on the file—e.g. by using other malware detection techniques of a security software package with which the security module 111 is integrated—or the like. If, however, the security module 111 determines that the executable file does indeed post a heightened threat of malware, then it takes an appropriate remediation action 520. As discussed above, the particular action taken can be determined according to a policy, and can include blocking the execution or transfer of the executable file, prompting a user for an action to take, and performing further analysis of the executable file to determine whether it constitutes a malware threat.

Thus, the above-described invention allows determining whether an executable file poses a heightened threat of malware by examining a set of symbols, such as section names, of the executable file and comparing it with the symbols of a symbol repository that represent symbols present in legitimate executable files. The set of symbols of an executable file is a useful indicator of whether the file constitutes malware, is computationally inexpensive to determine, and analysis thereof may be integrated into existing security software.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of detecting whether an executable file poses a heightened risk of malware, comprising:
   identifying a plurality of symbols in the executable file;
   comparing the identified symbols to a set of symbols expected to be present in a legitimate executable file;
   computing a count of ones of the identified symbols that are not within the set of symbols expected to be present;
   comparing the computed count to a threshold number of symbols; and
   responsive at least in part to the computed count exceeding the threshold number of symbols, determining that the executable file poses a heightened risk of malware.

2. The computer-implemented method of claim 1, wherein the identified symbols and the symbols of the set of symbols expected to be present represent section names that specify names for sections of executable files.

3. The computer-implemented method of claim 2, wherein the section names are fixed-length character arrays.

4. The computer-implemented method of claim 2, wherein the executable file is of the Portable Executable format and the section names are located in the Portable Executable section table.

5. The computer-implemented method of claim 1, wherein the set of symbols expected to be present comprises a union of symbol names extracted from a set of executable files of a plurality of legitimate programs.

6. The computer-implemented method of claim 1, further comprising:
   responsive to determining that the executable file poses a heightened risk of malware, performing additional analysis of the executable file to determine whether the executable file constitutes malware.

7. The computer-implemented method of claim 1, further comprising contacting a server for updates to the set of symbols expected to be present, responsive to determining that the executable file poses a heightened risk of malware.

8. A non-transitory computer-readable storage medium having executable computer program instructions embodied therein for detecting whether an executable file poses a heightened risk of malware, comprising:

a symbol repository adapted to store a plurality of symbols expected to be present in a legitimate executable file; and an analysis module for:

identifying a plurality of symbols in the executable file, comparing the identified symbols to the plurality of symbols expected to be present, computing a count of ones of the identified symbols that are not within the set of symbols expected to be present, comparing the computed count to a threshold number of symbols, and responsive at least in part to the computed count exceeding the threshold number of symbols, determining that the executable file poses a heightened risk of malware.

9. The computer-readable storage medium of claim 8, wherein the identified symbols and the symbols of the set of symbols expected to be present represent section names that specify names for sections of executable files.

10. The computer-readable storage medium of claim 9, wherein the section names are fixed-length character arrays.

11. The computer-readable storage medium of claim 9, wherein the executable file is of the Portable Executable format and the section names are located in the Portable Executable section table.

12. The computer-readable storage medium of claim 8, wherein the set of symbols expected to be present comprises a union of symbol names extracted from a set of executable files of a plurality of legitimate programs.

13. The computer-readable storage medium of claim 8, further comprising a remediation module performing actions comprising the following:

responsive to determining that the executable file poses a heightened risk of malware, performing additional analysis of the executable file to determine whether the executable file constitutes malware.

14. The computer-readable storage medium of claim 8, further comprising a repository update module for contacting a server for updates to the set of symbols expected to be present, responsive to determining that the executable file poses a heightened risk of malware.

15. A computer adapted to detect whether an executable file poses a heightened risk of malware, comprising:

a computer-readable storage medium storing executable computer program modules, the computer program modules comprising:

a symbol repository adapted to store a plurality of symbols expected to be present in a legitimate executable file; and an analysis module for:

identifying a plurality of symbols in the executable file, comparing the identified symbols to the plurality of symbols expected to be present, computing a count of ones of the identified symbols that are not within the set of symbols expected to be present, comparing the computed count to a threshold number of symbols, and responsive at least in part to the computed count exceeding the threshold number of symbols, determining that the executable file poses a heightened risk of malware.

16. The computer of claim 15, wherein the identified symbols and the symbols of the set of symbols expected to be present represent section names that specify names for sections of executable files.

17. The computer of claim 16, wherein the executable file is of the Portable Executable format and the section names are located in the Portable Executable section table.

18. The computer of claim 15, the computer program modules further comprising a remediation module performing actions comprising the following:

responsive to determining that the executable file poses a heightened risk of malware, performing additional analysis of the executable file to determine whether the executable file constitutes malware.

\* \* \* \* \*